United States Patent
Ota et al.

(10) Patent No.: US 8,177,131 B2
(45) Date of Patent: May 15, 2012

(54) DATA COMMUNICATION SYSTEM, DEVICE FOR EXECUTING IC CARD FUNCTION, CONTROL METHOD FOR THE DEVICE, AND INFORMATION PROCESSING TERMINAL

(75) Inventors: Toyokazu Ota, Shinagawa-ku (JP); Yasumasa Nakatsugawa, Shinagawa-ku (JP)

(73) Assignee: Felica Networks, Inc., Tokyo (JP)

( * ) Notice: Subject to any disclaimer, the term of this patent is extended or adjusted under 35 U.S.C. 154(b) by 0 days.

(21) Appl. No.: 13/172,296

(22) Filed: Jun. 29, 2011

(65) Prior Publication Data
US 2011/0254666 A1     Oct. 20, 2011

Related U.S. Application Data

(63) Continuation of application No. 11/993,315, filed as application No. PCT/JP2006/312247 on Jun. 19, 2006, now Pat. No. 7,997,480.

(30) Foreign Application Priority Data

Jun. 24, 2005  (JP) ................. 2005-185586

(51) Int. Cl.
*G06K 5/00*          (2006.01)
(52) U.S. Cl. ....... 235/380; 235/439; 235/375; 455/41.1; 455/42
(58) Field of Classification Search .............. 235/380, 235/493, 375; 455/41.1, 42
See application file for complete search history.

(56) References Cited

U.S. PATENT DOCUMENTS

| | | | |
|---|---|---|---|
| 6,719,206 | B1 | 4/2004 | Bashan et al. |
| 2002/0177407 | A1 | 11/2002 | Mitsumoto |
| 2003/0230631 | A1 | 12/2003 | Tsunoda et al. |
| 2004/0034766 | A1 | 2/2004 | Sakamura et al. |
| 2004/0035930 | A1 | 2/2004 | Arisawa et al. |
| 2004/0103234 | A1 | 5/2004 | Zer et al. |
| 2004/0110533 | A1 | 6/2004 | Yamagata et al. |
| 2004/0252561 | A1 | 12/2004 | Yamazoe et al. |
| 2005/0274803 | A1 | 12/2005 | Lee |
| 2006/0279410 | A1 | 12/2006 | Mitani et al. |
| 2009/0236416 | A1 | 9/2009 | Morita |

FOREIGN PATENT DOCUMENTS

| | | |
|---|---|---|
| JP | 11-213111 | 8/1999 |
| JP | 2000-322535 | 11/2000 |
| JP | 2000-341763 | 12/2000 |
| JP | 2002-247157 | 8/2002 |
| JP | 2002-374570 | 12/2002 |
| JP | 2003-203212 | 7/2003 |
| JP | 2004-516763 | 6/2004 |
| JP | 2005-052182 | 3/2005 |
| JP | 2005-079964 | 3/2005 |
| JP | 2005-85269 | 3/2005 |
| JP | 2005-108044 | 4/2005 |

*Primary Examiner* — Allyson Trail
(74) *Attorney, Agent, or Firm* — Oblon, Spivak, McClelland, Maier & Neustadt, L.L.P.

(57) ABSTRACT

An information processing terminal defines a data transfer state for permitting a contactless data communication through an IC card and a data not transfer state for not permitting the contactless data communication so that the IC card manages the communication state of the information processing terminal. The IC card can transfer data to the terminal side depending on whether it is in any of the data transfer state and the data not transfer state without depending on the notification from the information processing terminal, synchronization can be easily established, a transfer speed can be increased, and a large amount of data can be transmitted.

6 Claims, 9 Drawing Sheets

FIG. 15

DATA COMMUNICATION SYSTEM, DEVICE FOR EXECUTING IC CARD FUNCTION, CONTROL METHOD FOR THE DEVICE, AND INFORMATION PROCESSING TERMINAL

CROSS REFERENCES TO RELATED APPLICATIONS

This application is a continuation of and claims the benefit of priority under 35 U.S.C. §120 from U.S. Ser. No. 11/993,315, filed Feb. 27, 2008, the entire contents of which are incorporated herein by reference. The U.S. Ser. No. 11/993,315 is a national stage of PCT Application No. PCT/JP06/312247, filed Jun. 19, 2006, and claims the benefit of priority under 35 U.S.C. §119 from Japanese Patent Application JP2005-185586, filed on Jun. 24, 2005.

TECHNICAL FIELD

The present invention relates to a data communication system for transmitting data between equipments making use of a contactless interface, a device for executing an IC card function, and a method of controlling the device as well as an information processing terminal, and more particularly, to a data communication system for transmitting data between an equipment which can access to the contactless interface and an equipment connected to the contactless interface through wire, a device for executing an IC card function, and a method of controlling the device as well as an information processing terminal.

More particularly, the present invention relates to a card reading/writing device for accessing to an IC card function unit through a contactless interface, a data communication system for transmitting data between information terminals each of which is connected to the IC card function unit through wire or incorporates an IC chip, a device for executing an IC card function, and a method of controlling the device as well as an information processing terminal, and more particularly, to a device having a card reading/writing function, a data communication system for transmitting data at high speed between information terminals each of which is connected to the IC card function unit through wire or incorporates an IC chip, a device for executing an IC card function, and a method of controlling the device as well as an information processing terminal.

BACKGROUND ART

Contactless/proximity communication systems represented by an IC card have become widespread because they can be simply and conveniently manipulated. The IC card is ordinarily used by a user in such a manner that the user approaches the IC card to a card reading/writing device. The card reading/writing device polls an IC card at all times, and when it discovers an external IC card, a communication operation starts between the card reading/writing device and the external IC card. When, for example, a private code and other individual authentification information, the value information of an electronic ticket and the like are stored to an IC card, authentification processing for visitors and passengers can be executed in a cash dispenser, an entrance door of a concert hall, a ticket gate of a station, and the like.

Recently, as a miniaturization technology is improved, an IC card having a relatively large amount of memory capacity appears. According to an IC card having a large amount of memory capacity, one IC card can be used to a plurality of applications by extending a file system on a memory space and storing a plurality of applications at the same time. When, for example, a plurality of applications such as electronic money for executing electronic settlement, an electronic ticket for coming in a particular concert hall, and the like are stored on one IC card, the one IC card can be applied to various applications. The electronic money and the electronic ticket to which reference is made here indicate a construction which is settled (electronically) through electronic data issued according to a fund presented by a user or the electronic data itself.

Further, the IC card and the card reader/writer (card reading/writing device), which includes a wired interface to be connected to an external equipment in addition to the wireless and contactless interface, can be used by being built in respective equipments such as a mobile terminal, PDA (Personal Digital Assistance), CE (Consumer Electronics) equipment, personal computer, and the like. That is, when these equipments are provided with the function of any one or both of the IC card and the card reading/writing device, it is possible to execute a general-purpose bidirectional proximity data communication using a contactless communication technology making use of the IC card. Since an IC card technology has a tamper resistance because it is difficult to copy or alter the information in an IC card, this kind of proximity data communication can realize high-level security.

There is proposed, for example, a communication system among three components which is executed between a card reading/writing device and an information processing terminal, which is connected to an IC card or an IC chip through a wired interface, by interposing the IC card or the IC chip therebetween (refer to, for example, Patent Document 1). In the system, a data communication is executed among the reading/writing device, a program controller disposed in the information processing terminal, a wireless communication interface built in the information processing terminal for executing a wireless communication to the reading/writing device, a wired communication interface to be connected to the program controller, and the IC card with a memory.

The IC chip built in the information processing terminal has a wireless communication mode for executing transaction through the wireless communication interface in response to the carrier wave detected from the reading/writing device and a wired communication mode for executing transaction through the wired communication interface in response to the start of an internal power supply in the information processing terminal. In the wired communication mode, the program controller of the information processing terminal can issue an activate command for temporarily switching the wired communication mode to the wireless communication mode and a not activate command for returning the wireless communication mode, which is temporarily made effective, to the wired communication mode. On the other hand, in the wireless communication mode, an external card reading/writing device issues a second activate command for temporarily switching the wireless communication mode to the wired communication mode and a second not activate command for returning the wired communication mode, which is temporarily made effective, to the wireless communication mode.

In the wired communication mode, after the information processing terminal issues the activate command, temporarily shifts to the wireless communication mode, and writes data from the external card reading/writing device to the IC chip, it issues the not activate command this time, returns to the wired communication mode, and reads the data written to the IC chip to thereby transmit the data from the external card reading/writing device to the information processing terminal through the IC card. Further, after the information processing terminal writes data to the IC card, it issues the activate command, temporarily shifts to the wireless communication mode. Then, after the external card reading/writing device reads the data from the IC chip, the information processing terminal issues the not activate command this time and returns to the wired communication mode to thereby transmit the data therefrom to the external card reading/writing device through the IC card.

On the other hand, in the wireless communication mode, the external card reading/writing device issues the second activate command, temporarily shifts to the wired communication mode, and writes data from the information processing terminal to the IC chip. Then, the external card reading/writing device issues the second not activate command this time, returns to the wireless communication mode, and reads the data written to the IC chip to thereby transmit the data from the information processing terminal to the external card reading/writing device through the IC card. Further, after the external card reading/writing device writes data to the IC card, it issues the second activate command, temporarily shifts to the wired communication mode. Then, after the information processing terminal reads the data from the IC chip, the external card reading/writing device issues the second not activate command this time and returns to the wireless communication mode to thereby transmit the data from the external card reading/writing device to the information processing terminal through the IC card.

According to the communication system as described above, a secure data communication can be realized between an equipment having a card reading/writing function and the information processing terminal connected to the IC card through wire making use of a contactless data communication path realized by interposing the IC card.

On the other hand, since a conventional contactless IC card communication protocol employs such a procedure that when a command is transmitted, a response is received, it is not suitable to transmit a relatively large amount of data such as image data at high speed although it is suitable to securely transfer relatively short text data such as URL (Uniform Resource Locator).

Further, when it is considered to send data from the card reading/writing device side to the information processing terminal side, the interposed IC card does not have a mechanism for notifying that the data transmitted to the information processing terminal is received by the contactless interface through the wired interface. Accordingly, since the information processing terminal can not detect or confirm at once whether or not the IC card receives the data sent to it, a problem arises also in that it is difficult to synchronize transmitted data on the card reading/writing device side.

Patent Document 1: Japanese Unexamined Patent Application Publication No. 2003-203212

DISCLOSURE OF THE INVENTION

Problems to be Solved by the Invention

An object of the present invention is to provide an excellent data communication system capable of preferably executing a data transfer between an equipment, which can access to a contactless interface, and an equipment, which is connected to the contactless interface through wire, a device for executing an IC function and a method of controlling the device aw well as an information processing terminal.

A further object of the present invention is to provide an excellent data communication system capable of preferably executing a secure data transfer between a card reading/writing device, which accesses to an IC card function unit through a contactless interface, and an information terminal, which is connected to the IC card function unit through wire or incorporates an IC chip, a device for executing an IC function and a method of controlling the device as well as an information processing terminal.

A still further object of the present invention is to provide an excellent data communication system capable of transmitting a large amount of data at high speed between a device having a card reading/writing function and an information terminal, which is connected to an IC card function unit through wire or incorporates an IC chip, a device for executing an IC function and a method of controlling the device as well as an information processing terminal.

Means for Solving the Problems

A first aspect of the present invention, which was made in view of the above problems, is a data communication system for executing a data communication among an IC card function execution unit having a memory, a card reading/writing device capable of communicating with the IC card function execution unit through a contactless interface, and an information processing terminal capable of communicating with the IC card function execution unit through a wired interface by interposing the IC card function execution unit, and the data communication system is characterized by including a first communication means for causing the card reading/writing device to execute a data transfer operation to the memory in the IC card function execution unit through the contactless interface or causing the information processing terminal to execute a data transfer operation to the memory in the IC card function execution unit through the wired interface, a second communication means for executing a data transfer between the card reading/writing device and the information processing terminal on a communication path composed of the contactless interface and the wired interface through the IC card function execution unit interposed therebetween and a communication control means for executing a communication operation using any of the first or second communication means.

However, the "system", to which reference is made here, is composed of a plurality of devices (or function modules for realizing specific functions), and it is not particularly a problem whether the respective devices and function modules are disposed in a single housing (this is also applied to the following description).

The present invention relates to a communication system among three components having an IC chip interposed between a device having a card reading/writing function and an information processing terminal, which is connected to the IC chip having an IC card function. Note that although the IC chip as a contactless IC card function execution unit has a data transmission/reception function and a data processing unit, an RF analog/front end and a logic circuit (protocol control, RF modulation/demodulation, command processing, cipher processing, memory management) may be composed of one chip or may composed at least two separate chips in which the RF analog front end is separated from the logic circuit. Further, the IC chip includes a built-in type and an SIM card type. In the following description, these IC chips may be simply called an "IC card function execution unit" as a generic term.

Since an IC card technology has a tamper resistance because it is difficult to copy or alter the information in an IC card, this kind of the communication system among three components can realize high-level security.

However, since a conventional contactless IC card communication protocol employs such a procedure that when a command is transmitted, it receives a response, the conventional contactless IC card communication protocol is not suitable to transfer a relatively large amount of data at high speed. Further, since the conventional contactless IC card communication protocol does not have a mechanism for the IC card to notify the information processing terminal of that there is received data to the information processing terminal, it cannot confirms whether or not the information processing terminal receives data, from which a problem also arises in that it is difficult to synchronize transmitted data on the card reading/writing device side.

In contrast, in the communication system according to the present invention, The information processing terminal defines a data transfer state for permitting a contactless data communication through the IC card function unit and a data not transfer state for not permitting the contactless data communication so that the IC card function unit manages the communication state of the information processing terminal. When data is sent from the card reading/writing device through the contactless interface, the IC card function execution unit directly transmits the received data to the information processing terminal through the wired interface only in the data transfer state. Further, when data is sent from the information processing terminal through the wired interface, the IC card function execution unit directly transmits the received data to the card reading/writing device through contactless interface only in the data transfer state.

As described above, since the IC card function execution unit, which is interposed between the card reading/writing device and the information processing terminal, can transfer data to the terminal side depending on whether it is in the data transfer state or in the data not transfer state without depending on a notification from the information processing terminal, synchronization can be easily established, a transfer speed can be increased, and a large amount of data can be transmitted.

Further, the wired interface has a very low rate of occurrence of error as compared with the contactless interface and thus has high reliability. Accordingly, when data is transmitted on the contactless interface, although the IC card function execution unit returns a response to a command, a data transfer processing speed can be more increased by omitting a procedure for returning the response to the command when data is transmitted on the wired interface.

In the communication system among three components according to the present invention, the IC card function unit interposed between the card reading/writing device and the information processing terminal has a data transfer function in "an Ad-hoc communication mod" as a second communication means in addition to a data transfer function in "an ordinary communication mode" as a first communication means for executing an ordinary access operation to the memory in the IC card function unit. In the Ad-hoc communication mode, when data is sent from the card reading/writing device through the contactless interface, the IC card function unit directly transmits the received data to the information processing terminal through the wired interface. Further, when data is sent from the information processing terminal through the wired interface, the IC card function unit directly transmits the received data to the card reading/writing device.

In the Ad-hoc communication mode, since the information processing terminal is in "a data transfer state, in which it can receive the data received by the IC card function unit through the contactless interface as it is. That is, in the Ad-hoc communication mode, since the IC card function unit can directly transfer data without depending on the notification from the information processing terminal, synchronization can be easily established, a transfer speed can be increased, and a large amount of data can be transmitted. The data transfer from the card reading/writing device in this case is a data transfer to the information processing terminal having a different communication interface through the IC card function execution unit different from writing of data to IC card, and further a data transfer to the card reading/writing device having a different communication interface.

Further, a second aspect of the present invention is a device for executing an IC card function which is characterized by including a memory, a contactless interface capable of communicating with a card reading/writing device, a wired interface connected to an information processing terminal through wire, and a control means for controlling an access operation to the memory and a communication operation through the contactless interface and the wired interface, wherein the control means manages a communication mode set between the card reading/writing device and the information processing terminal and controls the operation of a communication path between the card reading/writing device and the information processing terminal according to a present communication mode.

Further, a third aspect of the present invention is an information processing terminal which is characterized by comprising an IC card function execution unit comprising an contactless interface, a memory, and a wired interface, a user input/output means and a program control means for controlling a processing operation according to a communication operation with the IC card function execution unit through the wired interface and a user interaction through the user input/output means, wherein the program control means has a data transfer state for permitting a data transfer to the IC card function execution unit through the wired interface and a data not transfer state for not permitting a data transfer to the IC card function execution unit through the wired interface.

The device for executing the IC card function according to the second aspect of the present invention can operate as the IC card function execution unit in the data communication system according to the first aspect of the present invention. In the device, the RF analog/front end and the logic circuit (protocol control, RF modulation/demodulation, command processing, cipher processing, memory management) may be composed of one chip or may composed at least two separate chips in which the RF analog front end is separated from the logic circuit. Further, the IC chip includes the built-in type and the SIM card type.

The IC card function execution unit can realize a similar transfer control in a communication system composed of a wireless network and a wired network by providing a hub with the same function when the hub has a contactless IC card interface to a card reading/writing device and a wired interface to an information processing terminal as well as has a wireless LAN function and a wired LAN function.

Further, the information processing terminal according to the third aspect of the present invention can operate as an information processing terminal capable of communicating with the IC card function execution unit through the wired interface in the data communication system according to the first aspect of the present invention.

Advantages of the Invention

According to the present invention, there can be provided the excellent data communication system capable of preferably executing a secure transfer between the card reading/ writing device which accesses to the to the IC card function unit through the contactless interface and the information terminal which is connected to the IC card function unit through wire or incorporates the IC chip, a device for executing the IC card function and the method of controlling the device as well as the information processing terminal.

Further, according to the present invention, there can be provided the excellent data communication system capable of transmitting a large amount of data at high speed between the device having the card reading/writing function and the information terminal which is connected to the IC card function unit through wire or incorporates the IC chip, a device for executing the IC card function and the method of controlling the device as well as the information processing terminal.

Further objects, features and advantages of the present invention will become apparent from the detailed description based on the embodiment of present invention described later and the attached drawings.

REFERENCE NUMERALS

1 . . . card reading/writing device
2 . . . IC card function execution unit
3 . . . controller
101 . . . antenna unit
102 . . . analog unit
103 . . . digital controller
104 . . . memory
105 . . . external interface
110 . . . mobile terminal
111 . . . program controller
112 . . . display unit
113 . . . user input unit

BEST MODE FOR CARRYING OUT THE INVENTION

An embodiment of the present invention will be described below in detail referring to the drawings.

The present invention relates to a communication system among three components having a contactless IC card function interposed between a device having a card reading/writing function and an information processing terminal, which is connected to an IC card function unit through a wired interface or having an IC chip built therein.

The IC chip, on which the contactless IC card function is mounted, may compose an RF analog front end and a logic circuit (protocol control, RF modulation/demodulation, command processing, cipher processing, memory management) of one chip or may compose them of at least two chips in which the RF analog front end is separated from the logic circuit. In the following description, these IC chips are simply called an "IC card" as a generic term. Further, the IC chip includes a built-in type and an SIM card type. In the following description, the IC card and the IC chip are also called an "IC card function execution unit" as a whole.

Since an IC card technology has a tamper resistance because it is difficult to copy or alter the information in an IC card, this kind of the communication system among three components can realize high-level security. First, the construction of a contactless data communication making use of the IC card function execution unit will be explained.

Figure 1:
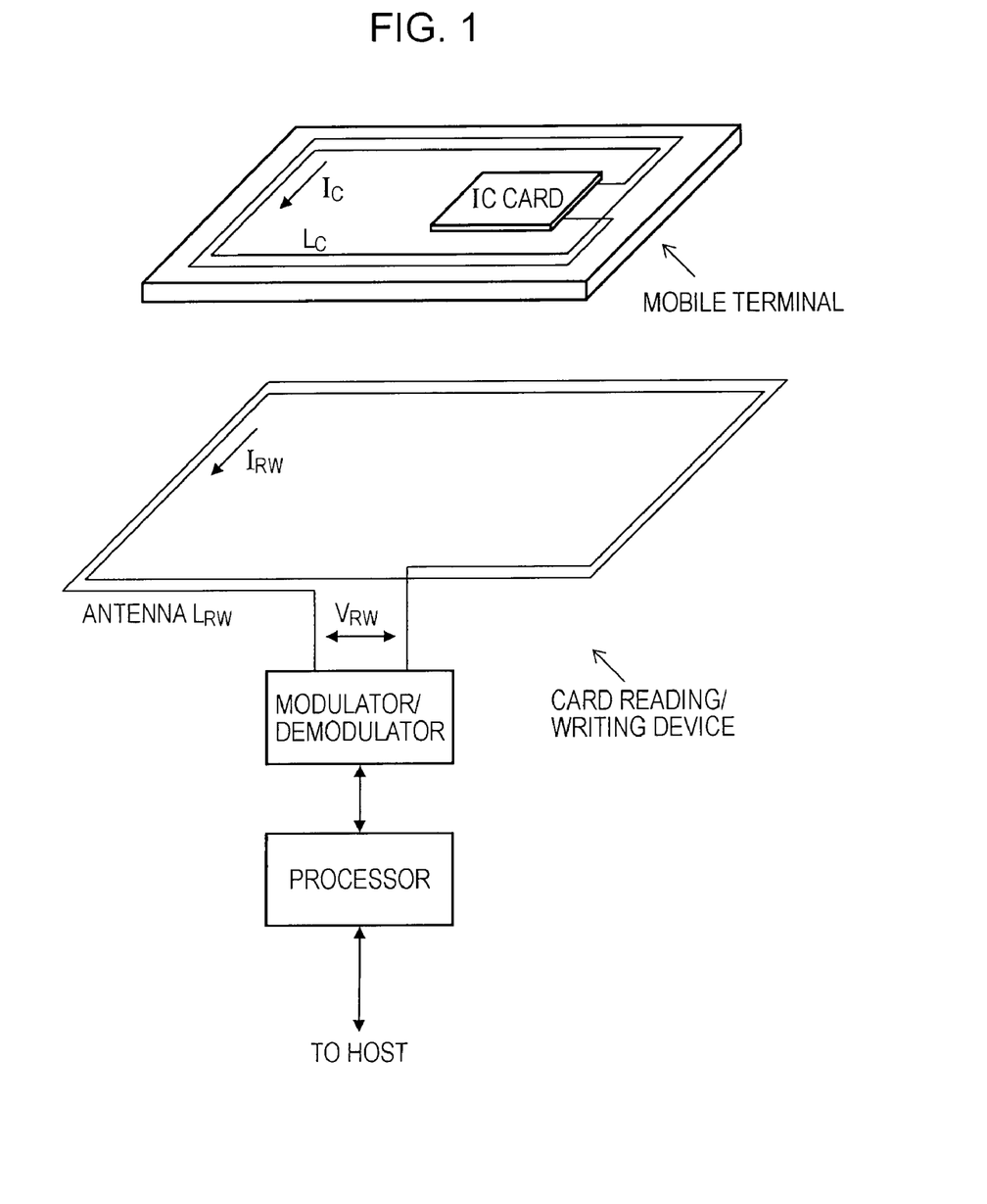
FIG. 1 is a view conceptually showing a construction of a wireless communication between a card reading/writing device and an IC card function execution unit based on electromagnetic induction.

A wireless communication between a card reading/writing device and the IC card function execution unit is realized based on, for example, the principle of electromagnetic induction. FIG. 1 conceptually shows the construction of the wireless communication between the card reading/writing device and the IC card function execution unit based on the electromagnetic induction. The card reading/writing device includes an antenna $L_{RW}$ composed of a loop coil, and a magnetic field is generated in the vicinity of the antenna $L_{RW}$ by causing a current $I_{RW}$ to flow thereto. On the other hand, a loop coil $L_C$ is electrically formed in the vicinity of the IC card function execution unit on the IC card function execution unit side. An induction voltage, which is generated by the magnetic field generated by the loop-antenna $L_C$ on the card reading/writing device side, is generated to the end of the loop coil $L_C$ on the IC card function execution unit side and input to a terminal of the IC card function execution unit connected to the end of the loop coil $L_C$.

Figure 2:
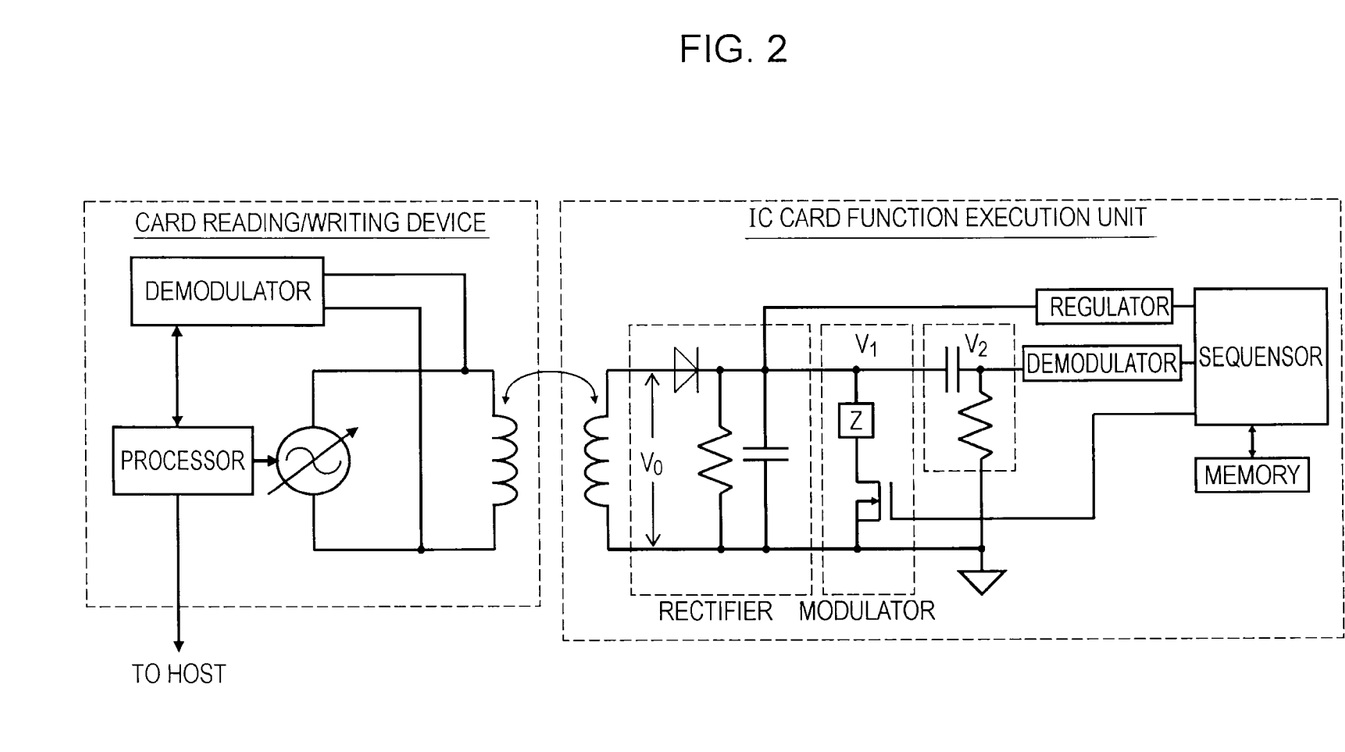
FIG. 2 is a view showing a system modeled as one transformer which is composed of a card reading/writing device and an IC card.

Although the degree of coupling of the antenna $L_{RW}$ on the card reading/writing device side and the loop coil $L_C$ on the IC card function execution unit side varies depending on the positional relation therebetween, it can be understood that one transformer is formed as a system, and thus the read/write operation of the IC card can be modeled as shown in FIG. 2.

When the current $I_{RW}$, which is caused to flow to the antenna $L_{RW}$, is modulated, on the card reading/writing device, the voltage $V_0$ induced to the loop coil $L_C$ on the IC chip is modulated, and the card reading/writing device can transmit data to the IC card function execution unit making use of the above modulation.

Further, the IC card function execution unit has a function (Load Switching) for varying the load between the terminals of the loop coil $L_C$ according to the data to be returned to the card reading/writing device. When the load between the terminals of the loop coil $L_C$ varies, the impedance between the antenna terminals varies on the card reading/writing device side, which appears as the variations of the current $I_{RW}$ passing through the antenna $L_{RW}$ and the voltage $V_{RW}$ thereof. The card reading/writing device can receive the data returned from the IC card function execution unit by demodulating the varied components.

That is, when the IC card function execution unit varies the load between the antennas thereof in response to the response signal to the query signal from the reading/writing device, the IC card function execution unit can execute a communication by applying an amplitude modulation to the signal appearing to a receiving circuit on the card reading/writing device.

Figure 3:
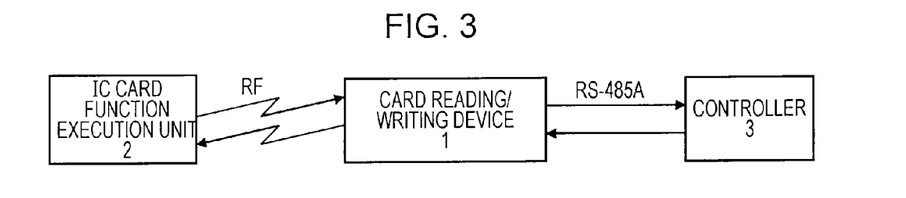
FIG. 3 is a view schematically showing the arrangement of a contactless IC card communication system.

As shown in FIG. 3, the contactless card system itself is composed of the card reading/writing device 1, the IC card function execution unit 2, and a controller 3, and data is transmitted and received between the card reading/writing device 1 and the IC card 2 making used of an electromagnetic wave. That is, the card reading/writing device 1 transmits a predetermined command to the IC card function execution unit 2, and the IC card function execution unit 2 executes processing corresponding to the received command. Then, the IC card function execution unit 2 transmits response data corresponding to the result of processing to the card reading/writing device 1.

The card reading/writing device 1 is connected to the controller 3 through a predetermined interface (which is based on, for example, RS-485A standard and the like). The controller 3 supplies a control signal to the card reading/writing device 1 to thereby cause it to execute predetermined processing to the IC card function execution unit 2.

In the communication system among three components according to the present invention, the IC card function execution unit is provided with a wired interface to be connected to an external equipment, in addition to the wireless and contactless interface and can be used by being built in or connected through wire to mobile terminals such as a mobile terminal, PDA (Personal Digital Assistance), CE (Consumer Electronics) equipment, and the like (or to information processing terminals such as a personal computer and the like).

Figure 4:
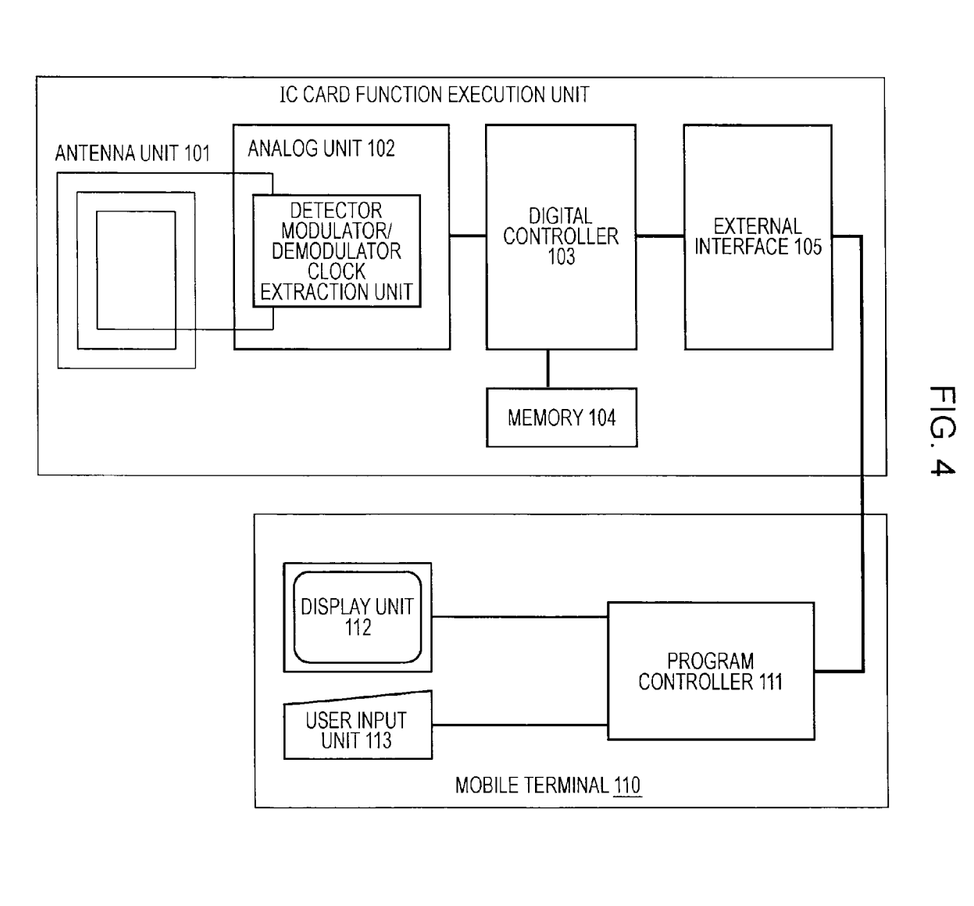
FIG. 4 is a view schematically showing the hardware arrangement of an IC card function execution unit according to an embodiment of the present invention.

FIG. 4 schematically shows the hardware arrangement of this type of the IC card function execution unit. As shown in the drawing, the IC card function execution unit is composed of an analog unit 102 connected to an antenna unit 101, a digital controller 103, a memory 104, and an external interface 105 and built is a mobile terminal 110. The IC card function execution unit may be composed of one chip semiconductor integrated circuit or two chip semiconductor integrated circuit in which an RF analog front end is separated from a logic circuit unit.

The antenna unit 101 executes a contactless data transmission/reception between it and the not shown card reading/writing device.

The analog unit 102 executes processings of the analog signal transmitted from and received by the antenna unit 101 such as detection, modulation/demodulation, clock extraction, and the like. They constitute the contactless interface between the IC card function execution unit and the card reading/writing device.

The digital controller 103 integrally controls the processing of transmission/reception data and the other operations executed in the IC card function execution unit. The digital controller 103 is locally connected to the memory 104 which can be addressed. The memory 104 is composed of a non-volatile memory device such as an EEPROM (Electrically Erasable Programmable Read Only Memory) and the like and can be used to store the user data of electronic money, an electronic ticket, and the like, to write a program code executed by the digital controller 103, and to store job data being executed.

In the embodiment, the IC card function execution unit has an ordinary communication mode for controlling the ordinary access operation from the card reading/writing device to the memory 104 in the IC card function execution unit and an Ad-hoc communication mode interposed between the direct data transfers of the card reading/writing device having a different interface protocol and the mobile terminal. Although the digital controller 103 also controls the state transition between these mode according to an external event as well as controls a communication operation in the respective communication modes, which will be described later in detail.

The external interface 105 is a function module for the digital controller 103 to be connected to a device such as the mobile terminal 110 and the like by an interface protocol different from the contactless interface connected to the card reading/writing device (not shown). The data written to the memory 104 can be transmitted to the mobile terminal 110 through the external interface 105.

When a communication is executed to the card reading/writing device, the data received from the card reading/writing device is transmitted to the mobile terminal 110 through the external interface 105 as it is, after it is converted by an appropriate conversion rule, or after it is converted to another packet structure. On the contrary, the data received from the mobile terminal 110 through the external interface 105 is transmitted to card reading/writing device as it is, after it is converted by an appropriate conversion rule, or after it is converted to another packet structure.

In the embodiment, it is assumed that the IC card function execution unit is used by being built in the mobile terminal 110 as a mobile terminal, and a wired interface such as UART (Universal Asynchronous Receiver Transmitter) is used as the external interface 105.

The IC card function execution unit can be driven by the energy obtained from the signal received from the card reading/writing device through, for example, the antenna unit 101. It is needless to say that the IC card function execution unit may be partly or wholly operated by the power supplied through the wired interface 105 on the mobile terminal 110 side.

Further, it is assumed that a hardware signal line (to be described later) is included in the wired interface 105 for the IC card function execution unit to notify the mobile terminal 110 side that it receives an Ad-hoc communication request command for requesting to transfer data from the card reading/writing device.

The mobile terminal 110 corresponds to a mobile terminal, for example, a mobile terminal, PDA, personal-computer (PC), and the like. The mobile terminal 110 is composed of a program controller 111, a display unit 112, and a user input unit 113.

The program controller 111 is composed of, for example, a microprocessor, RAM, and ROM (any of which is not shown in FIG. 4), and the microprocessor executes various processing services using the RAM as a working region according to the program code stored in the ROM. The processing services include a processing to the IC card function execution unit in addition to the intrinsic function of the mobile terminal 110 such as the mobile terminal and the like. It is needless to say that the program controller 111 may include an external memory device such as a hard disc and the like and other peripheral devices.

In the embodiment, the program controller 111 defines a data transfer state, in which the mobile terminal 110 permits a contactless data communication through the IC card function execution unit and a non-data transfer state in which the mobile terminal 110 does not permit the contactless data communication so that the IC card function execution unit manages the communication state of the mobile terminal 110.

Note that in the arrangement example shown in FIG. 4, although the antenna unit 101 for the contactless IC card interface is mounted in the IC chip as the IC card function execution unit, the antenna unit 101 is not limited thereto. There is also considered a mounting mode in which, for example, the antenna unit 101 is externally attached to an IC chip module or the antenna unit 101 is disposed to the mobile terminal 101 side in which the IC chip module is built in.

Since the IC card technology has a tamper resistance because it is difficult to copy or alter the information in an IC card, the communication system among three components making use of the contactless interface can realize high-level security. However, since a conventional contactless IC card communication protocol employs such a procedure that when a command is transmitted, a response is received, the it is not suitable to transfer a relatively large amount of data at high speed. Further, since the conventional contactless IC card communication protocol does not have a mechanism for an IC card to notify the mobile terminal 110 of that data to the mobile terminal 110 is received, it cannot confirm whether or not the mobile terminal 110 receives the data, from which a problem also arises in that it is difficult to synchronize transmitted data on the card reading/writing device side.

In contrast, in the communication system according to the present invention, the program controller 111 defines data transfer state, in which the mobile terminal 110 permits the contactless data communication through the IC card function execution unit and the non-data transfer state in which the mobile terminal 110 does not permit the contactless data communication so that the IC card function execution unit manages the communication state of the mobile terminal 110. When data is sent from the card reading/writing device through the contactless interface, the IC card function execution unit directly transmits the received data to the mobile terminal through the wired interface only in the data transfer state. Further, when data is sent from the mobile terminal 110 through the wired interface, the IC card function execution unit directly transmits the received data to the card reading/writing device through contactless interface only in the data transfer state.

As described above, since the IC card function execution unit, which is interposed between the card reading/writing device and the mobile terminal 110, can transfer data to the terminal side depending on whether it is in the data transfer state or in the data not transfer state without depending on a notification from the mobile terminal 110, synchronization can be easily established, a transfer speed can be increased, and a large amount of data can be transmitted.

Further, the wired interface has a very low rate of occurrence of error as compared with the contactless interface and thus has high reliability. Accordingly, when data is transmitted on the contactless interface, although the IC card function execution unit returns a response to a command, a data transfer processing speed can be more increased by omitting a procedure for returning the response to the command when data is transmitted on the wired interface.

A communication operation in the communication system among three components according to the present invention will be explained below in detail.

Figure 5:
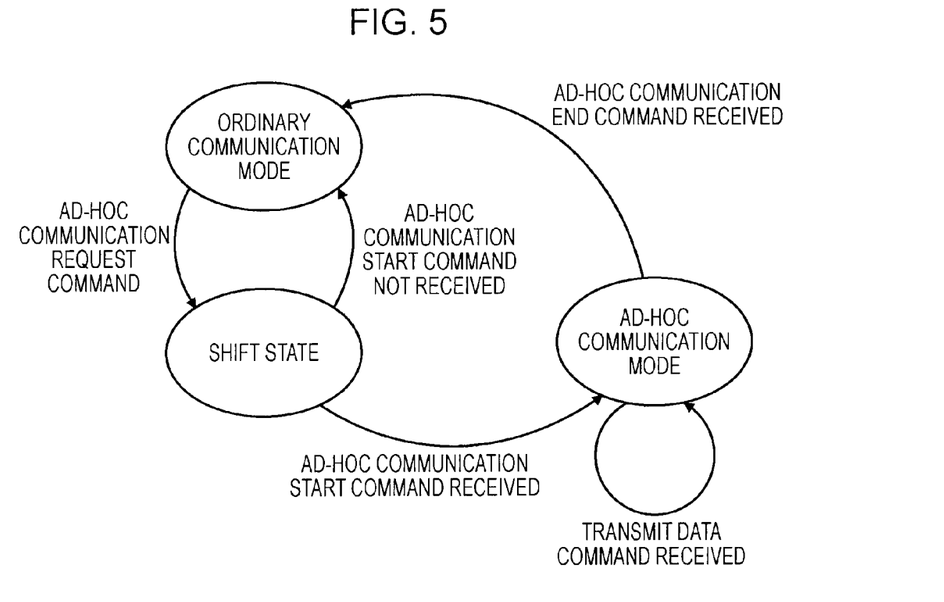
FIG. 5 is a view showing the state transition of an IC card interposed between a card reading/writing device and an information processing terminal in a communication system among three components.

FIG. 5 is a state transition view of the IC card function execution unit interposed between the card reading/writing device and the information processing terminal in the communication system among three components. As shown in the drawing, the IC card function execution unit has "the ordinary communication mode" corresponding to the data not transfer state and "the Ad-hoc communication mode" corresponding to the data transfer state. The state transition operation is controlled by the digital controller 103 in the IC card function execution unit according to the external event.

Figure 6:
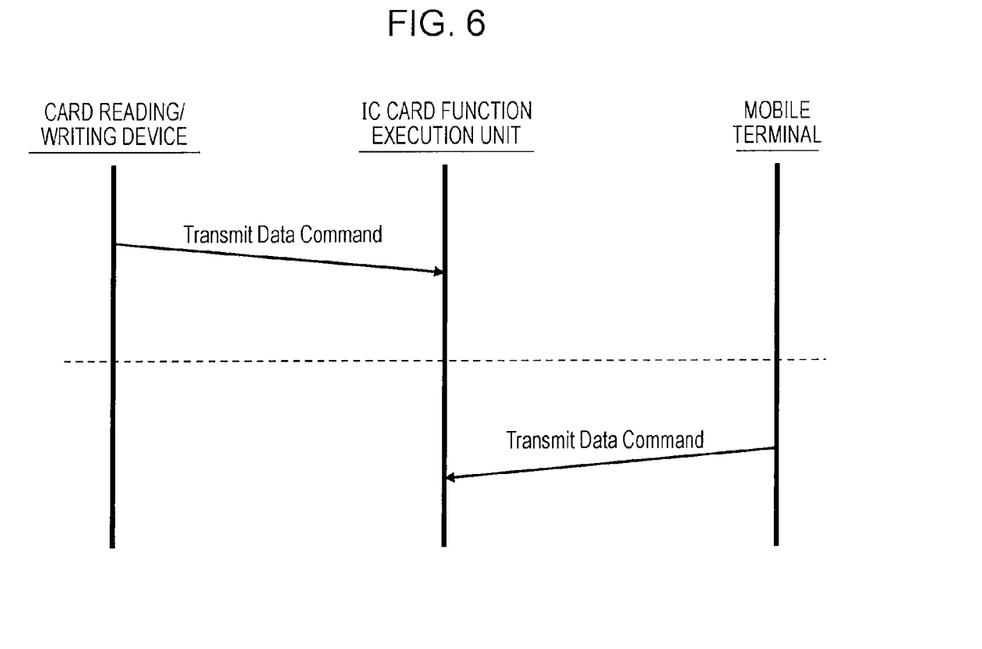
FIG. 6 is a view schematically showing an operation sequence of the communication system among three components to access to the IC card function execution unit in an ordinary communication mode.

In the ordinary communication mode, the ordinary access operation is executed to the IC card function execution unit. FIG. 6 schematically shows an operation sequence of the communication system among three components for accessing the IC card function execution unit in the ordinary communication mode. When the card reading/writing device has data to be written to the IC card function execution unit or data to be read out from the IC card function execution unit, after the card reading/writing device establishes a session by a predetermined authentification procedure through the contactless interface (not shown), it transmits a data transfer command (Transmit Data Command) and writes data to or reads out data from the IC card function execution unit. Further, when the mobile terminal has data to be written to the IC card function execution unit or data to be read out from the IC card function execution unit, after the mobile terminal establishes a session by a predetermined authentification procedure through the wired interface (not shown), it transmits a data transfer command and writes data to or reads out data from the IC card function execution unit.

The communication procedure of the communication among three components through the IC card function execution unit in the ordinary communication mode is executed according to, for example, the communication method disclosed in Japanese Unexamined Patent Application Publication No. 2003-203212 and already assigned to the applicant.

That is, the mobile terminal issues an activate command, temporarily shifts from the wired communication mode to the wireless communication mode, writes data from the card reading/writing device to the IC card function execution unit. Then, the mobile terminal issues a not activate command, returns to the wired communication mode, and reads the data written to the IC card function execution unit to thereby transfer the data from the card reading/writing device to the mobile terminal through the IC card function execution unit. Further, after the mobile terminal writes data to the IC card function execution unit, it issues an activate command, and temporarily shifts to the wireless communication mode, and the card reading/writing device reads data from the IC card function execution unit. Then, the mobile terminal issues a not activate command this time, and returns to the wired communication mode to thereby transfer the data from the mobile terminal to the card reading/writing device through the IC card function execution unit.

Further, in the ordinary communication mode, the card reading/writing device issues a second activate command, temporarily shifts from the wireless communication mode to the wired communication mode, and write data from the mobile terminal to the IC card function execution unit. Then, the card reading/writing device issues a second not activate command this time, returns to the wireless communication mode, and reads the data written to the IC card function execution unit to thereby transmit the data from the mobile terminal to the card reading/writing device through the IC card function execution unit. Further, after the card reading/writing device writes data to the IC card function execution unit, it issues a second activate command, and temporarily shifts to the wired communication mode, and the mobile terminal reads the data from the IC card function execution unit. Then, the card reading/writing device issues a second not activate command this time and returns to the wireless communication mode to thereby transfer the data from the card reading/writing device to the mobile terminal through the IC card function execution unit.

As described above, in the ordinary communication mode, the IC card function execution unit does not directly transmits the data received from the card reading/writing device through the contactless interface to the mobile terminal through the wired interface and does not directly transfer the data received from the mobile terminal through the wired interface to the card reading/writing device through the contactless interface. In other words, the data transmission executed between the card reading/writing device and the mobile terminal through the IC card function execution unit is not synchronized. In the ordinary communication mode, the mobile terminal is in "the data not transfer state" in which it does not receive the data received by the IC card function execution unit through the contactless interface as it is.

In contrast, in the Ad-hoc communication mode, when data is transmitted from the card reading/writing device through the contactless interface, the IC card function execution unit directly transmits the received data to the mobile terminal through the wired interface. Further, when data is transmitted from the mobile terminal through the wired interface, the IC card function execution unit directly transmits the received data to the card reading/writing device through the contactless interface.

In the Ad-hoc communication mode, the mobile terminal is in "the data transfer state" in which the mobile terminal can receive the data, which is received by the IC card function execution unit through the contactless interface, as it is. That is, in the Ad-hoc communication mode, since the IC card function execution unit can directly executes a data transfer without depending on the notification from the mobile terminal, synchronization can be easily established, a transfer speed can be increased, and the transfer of a large amount of data can be realized.

Figure 7:
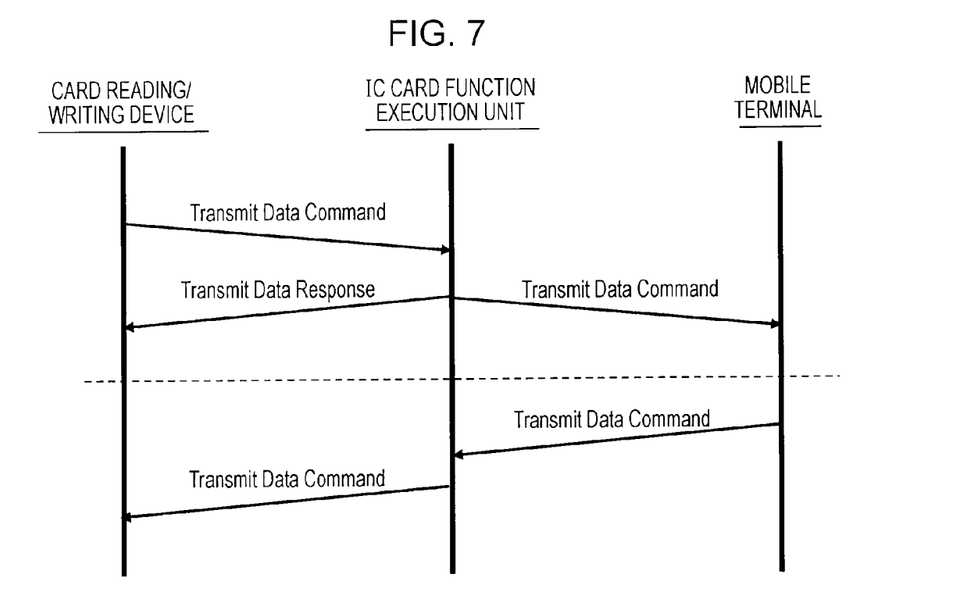
FIG. 7 is a view schematically showing an operation sequence of the communication system among three components to access to the IC card function execution unit in an Ad-hoc communication mode.

FIG. 7 schematically shows an operation sequence for executing a communication among three components in the Ad-hoc communication mode.

When transfer data exists, the card reading/writing device transmits a data transfer command after it establishes a session by a predetermined authentification procedure through the contactless interface (not shown).

After the IC card function execution unit subjects the data transfer command from the card reading/writing device to a predetermined protocol conversion, it transfers the data transfer command to the mobile terminal through the wired interface. The data transfer from the card reading/writing device in this case is a data transfer to the mobile terminal having a different communication interface through the IC card function execution unit different from writing of data to the memory in the IC card function execution unit.

Further, when the transfer data exists, the mobile terminal transmits a data transfer command after it establishes a session by a predetermined authentification procedure through the wired interface (not shown).

After the IC card function execution unit subjects the data transfer command from the mobile terminal to a predetermined protocol conversion, the IC card function execution unit transfers the data transfer command to the card reading/writing device through the contactless interface. The data transfer from the mobile terminal communication interface in this case is a data transfer to the card reading/writing device having the different communication interface through the IC card function execution unit different from writing of data to the memory in the IC card function execution unit.

Note that as shown in FIG. 7, the IC card function execution unit receives data transfer command from the card reading/writing device through the contactless interface and transfers the data transfer command to the mobile terminal through the wired interface and at the same time returns a data transfer response to the card reading/writing device. On the other hand, the IC card function execution unit receives a data transfer command from the mobile terminal through the wired interface, and when the IC card function execution unit desires to transfer it to the card reading/writing device through the contactless interface, the IC card function execution unit does not returns a response. This is for the purpose of executing transfer processing at higher speed by omitting a procedure for returning a response because the wired interface has a very low rate of occurrence of error during a data transfer and a high reliability as compared with the contactless interface.

When the IC card function execution unit receives an Ad-hoc communication request command (Propose Ad-hoc Command) from the card reading/writing device side in the ordinary communication mode, it temporarily shifts to the Ad-hoc communication mode (refer to FIG. 5).

Figure 8:
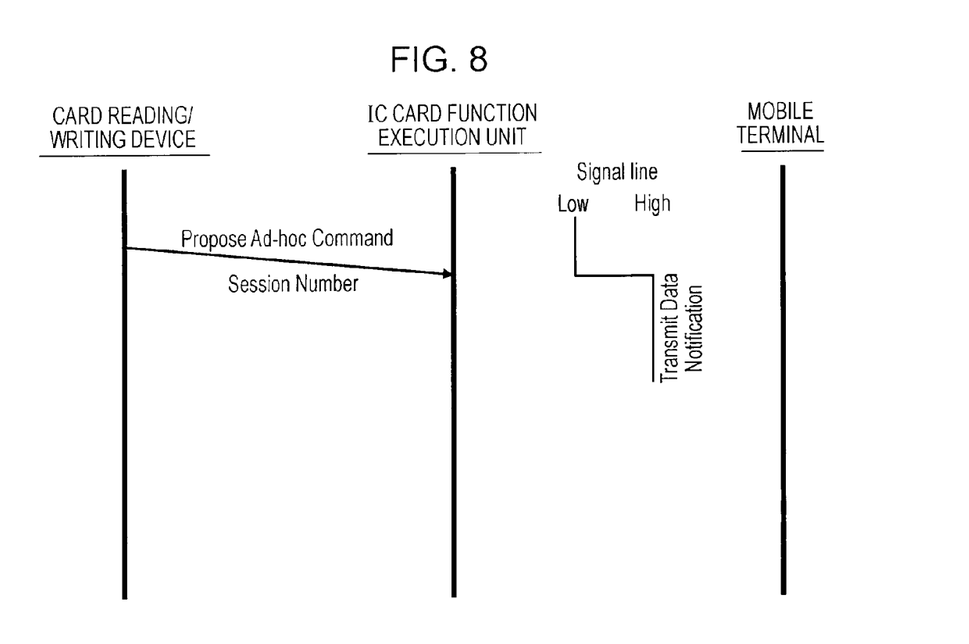
FIG. 8 is a view showing an operation sequence in which the card reading/writing device requests an Ad-hoc communication to the IC card function execution unit.

FIG. 8 shows an operation sequence for the card reading/writing device to request an Ad-hoc communication to the IC card function execution unit. When the card reading/writing device desires to transfer data to the mobile terminal, it creates an arbitrary session number and transmits the Ad-hoc communication request command to the IC card function execution unit.

The wired interface for connecting the IC card function execution unit to the mobile terminal includes the hardware signal line for notifying the mobile terminal side that the IC card function execution unit receives the Ad-hoc communication request command, which requests a data transfer, from the card reading/writing device (described above). The IC card function execution unit in the ordinary communication mode shifts the signal line from a low level to a high level in response to that it receives the command to thereby prompt the mobile terminal to transit its state, and waits that an acceptance command is returned.

When the IC card function execution unit receives the acceptance from the mobile terminal within a predetermined period from the time at which it transfers an Ad-hoc communication start command, it shifts to the Ad-hoc communication mode. On the other hand, when the IC card function execution unit cannot confirm the acceptance within the predetermined period, it returns to the ordinary communication mode (refer to FIG. 5).

Figure 9:
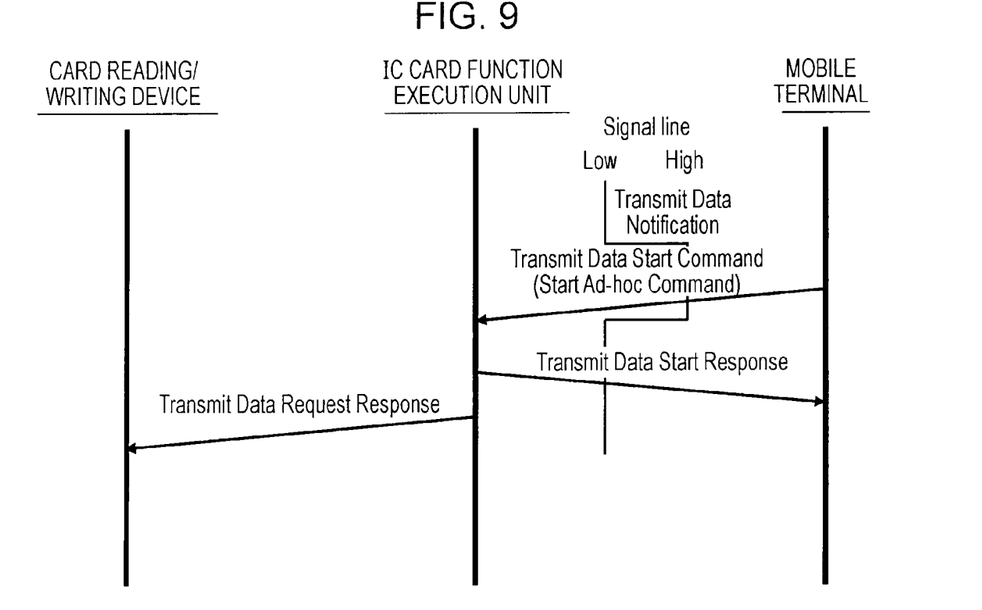
FIG. 9 is a view showing an operation sequence when the information processing terminal accepts an Ad-hoc communication start mode.

FIG. 9 shows an operation sequence when the mobile terminal accepts an Ad-hoc communication start mode. The mobile terminal recognizes that an Ad-hoc communication request occurs by detecting that a specific signal line in the wired interface to the IC card function execution unit shifts from a low-level to a high-level.

When the mobile terminal permits an Ad-hoc communication, that is, a data transfer to the card reading/writing device through the IC card function execution unit, the mobile terminal itself shifts from the data not transfer state to the data transfer state, and returns an Ad-hoc communication start command (Start Ad-hoc Command) to the IC card function execution unit.

When the IC card function execution unit receives the Ad-hoc communication start command from the mobile terminal, it shifts to the Ad-hoc communication mode and returns an Ad-hoc communication start response from the wired interface to the mobile terminal as well as returns an Ad-hoc communication request response from the contactless interface to the card reading/writing device. Further, the IC card function execution unit stores the session number included in the Ad-hoc communication start command.

Note that although not shown, The Ad-hoc communication in the communication system among three components can be also started by issuing the Ad-hoc communication start command from the mobile terminal side through the wired communication interface.

In the Ad-hoc communication mode, the mobile terminal is in "the data transfer state" in which it can receive the data, which is received by the IC card function execution unit through the contactless interface, as it is. The IC card function execution unit keeps the Ad-hoc communication mode as long as a data transfer command continues from the mobile terminal or the card reading/writing device (refer to FIG. 5).

After the IC card function execution unit subjects the data transfer command from the card reading/writing device to the predetermined protocol conversion, the IC card function execution unit transfers the command to the mobile terminal through the wired interface. The data transfer from the card reading/writing device in this case is a data transfer to the mobile terminal having the different communication interface through the IC card function execution unit different from writing of data to the IC card function execution unit.

Further, after the IC card function execution unit subjects the data transfer command from the mobile terminal to the predetermined protocol conversion, the IC card function execution unit transfers the command to the card reading/writing device through the contactless interface. The data transfer from the mobile terminal in this case is a data transfer to the card reading/writing device having the different communication interface through the IC card function execution unit different from the ordinary contactless access to the IC card function execution unit.

Figure 10:
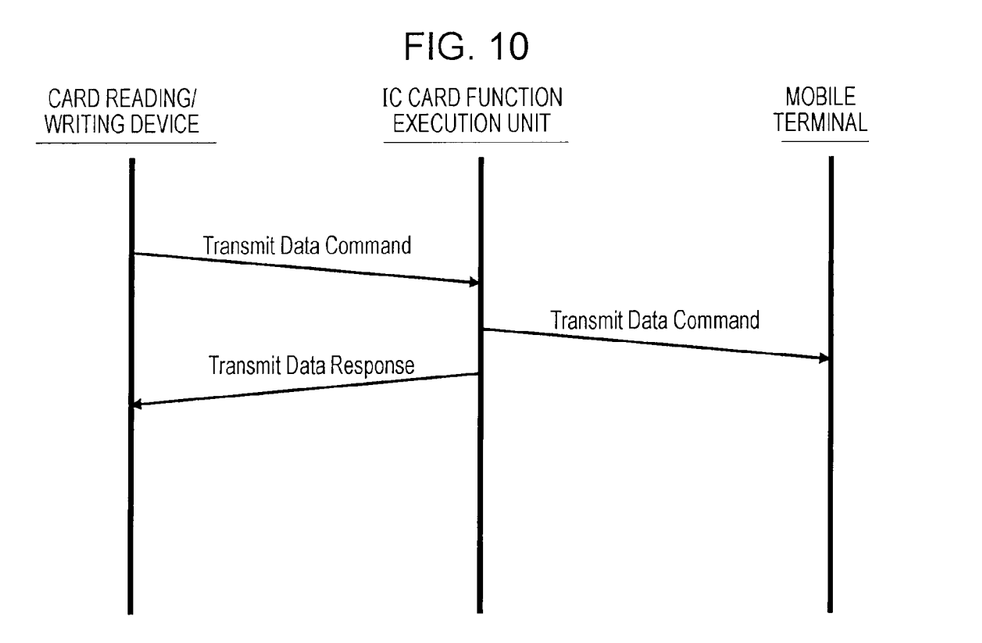
FIG. 10 is a view schematically showing an operation sequence of the communication system among three components in the Ad-hoc communication mode.
Figure 11:
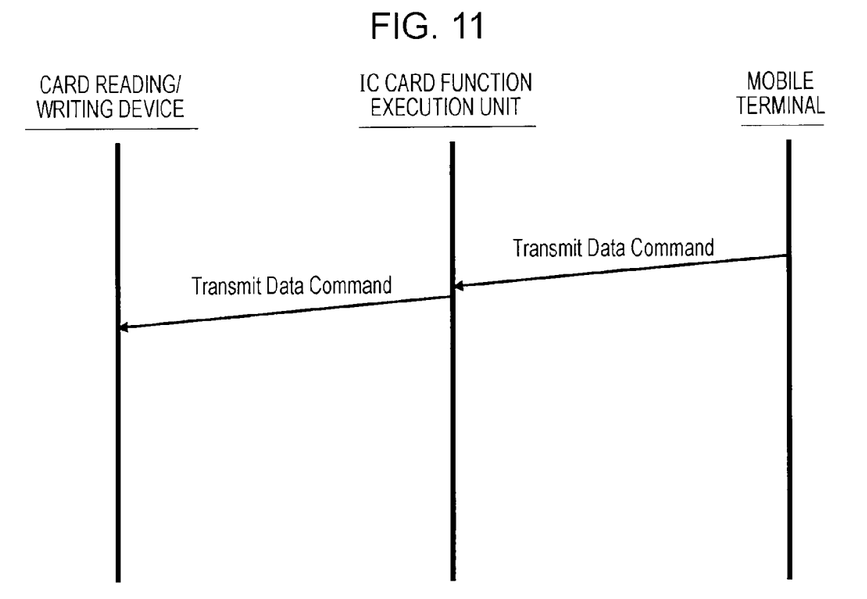
FIG. 11 is a view schematically showing an operation sequence of the communication system of the three components in the Ad-hoc communication mode.

FIGS. 10 and 11 schematically show an operation sequence of the communication system among three components in the Ad-hoc communication mode.

When the card reading/writing device receives the Ad-hoc communication request response from the IC card function execution unit, it transmits a data transfer command through the contactless interface. In contrast, when the IC card itself is in the Ad-hoc communication mode (that is, the mobile terminal is in the transfer state) as well as the session number attached to the data transfer command agrees with the session number stored when the IC card shifts to the Ad-hoc communication mode, the IC card transfers the data transfer command to the mobile terminal through the wired interface. Then, the IC card function execution unit returns a data transfer response to the card reading/writing device.

Further, when the IC card function execution unit receives the data transfer command from the mobile terminal through the wired interface, the IC card function execution unit itself is in the Ad-hoc communication mode (that is, the mobile terminal is in the transfer state) as well as the session number attached to the data transfer command agrees with the session number stored when the IC card function execution unit shifts to the Ad-hoc communication mode, the IC card function execution unit transfers the data transfer command to the card reading/writing device through the contactless interface. However, in this case, the IC card function execution unit does not return a response to the mobile terminal as a data transmission source. This is for the purpose of executing transfer processing at higher speed by omitting a procedure for returning a response because the wired interface has a very low rate of occurrence of error during a data transfer and a high reliability as compared with the contactless interface.

Further, when the IC card function execution unit, which is in the Ad-hoc communication mode, receives an Ad-hoc communication finish command from the card reading/writing device, it returns to the ordinary communication mode (refer to FIG. 5).

Figure 12:
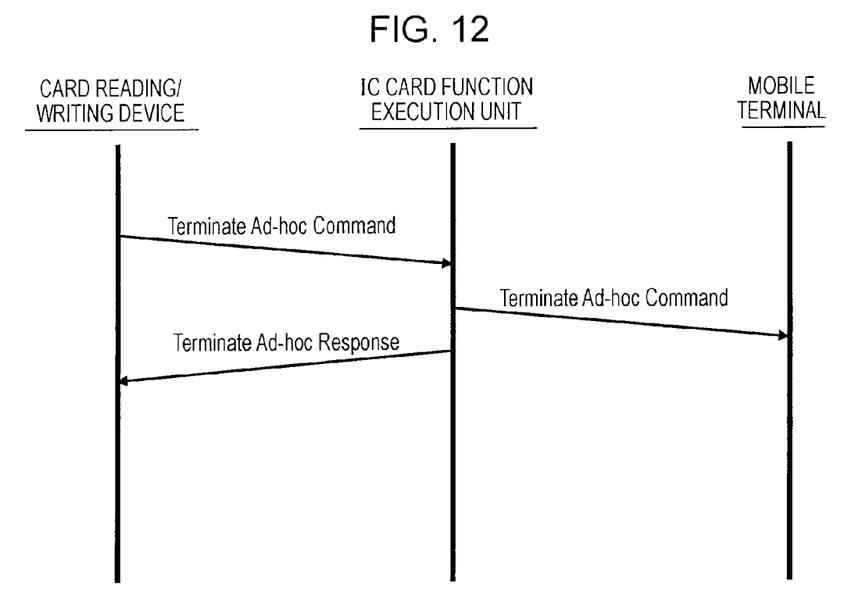
FIG. 12 is a view showing an operation sequence of the communication system among the three components when the IC card function execution unit transits from the Ad-hoc communication mode to the ordinary communication mode.

FIG. 12 shows an operation sequence of the communication system among three components when the IC card function execution unit transits from the Ad-hoc communication mode to the ordinary communication mode.

When the card reading/writing device has no data to be transmitted to the mobile terminal or no data to be received from the mobile terminal, it transmits the Ad-hoc communication finish command to the IC card.

When the IC card function execution unit receives the Ad-hoc communication finish command from the card reading/writing device through the contactless interface, the IC card function execution unit transfers it to the mobile terminal through the wired interface. The mobile terminal transits from the data transfer state to the data not transfer state in response to the command. Further, the IC card function execution unit itself transits to the ordinary communication mode as well as returns an Ad-hoc communication finish response to the card reading/writing device.

Note that although not shown, the IC card function execution unit can also finish the Ad-hoc communication and return to the ordinary communication mode by issuing the Ad-hoc communication finish command from the mobile terminal side through the wired communication interface.

Figure 13:
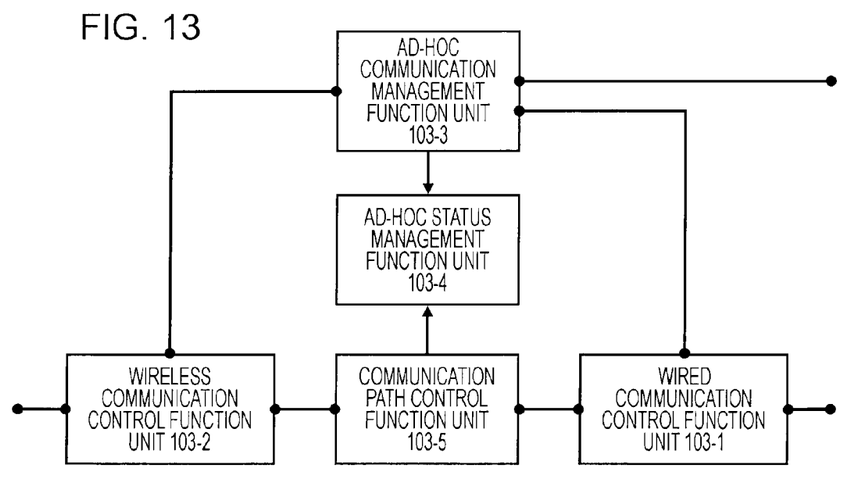
FIG. 13 is a view schematically showing a functional arrangement for controlling the state transition shown in FIG. 5.

The digital controller 103 in the IC card function execution unit controls the state transition shown in FIG. 5 in response to the external event such as the Ad-hoc communication start/finish command and the like from the card reading/writing device. FIG. 13 schematically shows a functional arrangement for controlling the state transition in the digital controller 103.

A wired communication control function unit 103-1 controls a communication operation to the mobile terminal through the wired interface. Further, a wireless communication control function unit 103-2 controls a communication operation to the card reading/writing device through the wireless interface.

An Ad-hoc communication management function unit 103-3 controls the operation mode of the IC card function execution unit in response to the external event. Specifically, the IC card function execution unit transits from the ordinary communication mode to the Ad-hoc communication mode in response to the Ad-hoc communication start command from the card reading/writing device or the mobile terminal, and finishes the Ad-hoc communication and returns to the ordinary communication mode in response to the Ad-hoc communication finish command from the card reading/writing device or the mobile terminal. When the Ad-hoc communication management function unit 103-3 receives the Ad-hoc communication start command from the card reading/writing device, the Ad-hoc communication management function unit 103-3 directly notifies the mobile terminal of it using a specific signal line in the wired interface without through the wired communication control function unit 103-1.

An Ad-hoc state management function unit 103-4 keeps the present operation mode set by the Ad-hoc communication management function unit 103-3 in a non-volatile state.

A communication path control function unit 103-5 controls the access operation to the IC card function execution unit through the contactless interface and the wired interface according to the present operation mode stored to the Ad-hoc state management function unit 103-4. Further, communication path control function unit 103-5 controls the operation of the communication path, which is composed of the contactless interface and the wired interface, between the card reading/writing device and the mobile terminal.

The access in the ordinary communication mode is a data writing or reading operation to the memory 104 in the IC card function execution unit. In this case, the communication path control function unit 103-5 controls the communication operation so that the memory access operation from the card reading/writing device through the contactless interface or the memory access operation from an information processing device through the wired interface can be executed exclusively.

On the other hand, in an Ad-hoc communication operation mode, the access from the card reading/writing device and the mobile terminal to the IC card function execution unit is not the access to the memory 104 in the IC card function execution unit and corresponds to the direct data transfer therebetween through the IC card function execution unit. In this case, the communication path control function unit 103-5 controls a communication path such that when data is sent from the card reading/writing device through the contactless interface, the communication path control function unit 103-5 directly transmits the data to the mobile terminal through the wired interface as well as when data is sent from the mobile terminal through the wired interface, the communication path control function unit 103-5 directly transmits the data to the card reading/writing device through the contactless interface.

Figure 14:
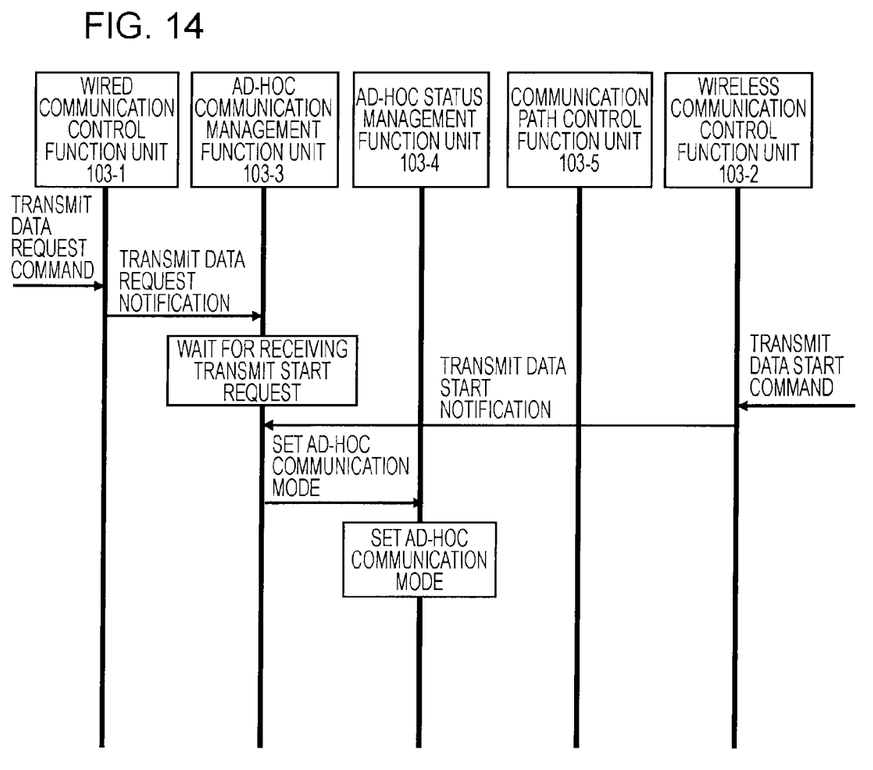
FIG. 14 is a view showing an operation flow for starting an Ad-hoc communication by a control arrangement shown in FIG. 13.

FIG. 14 shows an operation flow for starting the Ad-hoc communication by a control arrangement shown in FIG. 13.

When the wireless communication control function unit 103-2 receives an Ad-hoc communication start request command (Propose Ad-hoc Command) from the mobile terminal through the contactless interface, the wireless communication control function unit 103-2 notifies the Ad-hoc management function unit 103-3 of it.

When the Ad-hoc management function unit 103-3 notifies the request command of the mobile terminal using the hardware signal line, the Ad-hoc management function unit 103-3 waits until it receives the Ad-hoc communication start command.

When the mobile terminal accepts the Ad-hoc communication, it shifts from the data not transfer state to the data transfer state as well as returns the Ad-hoc communication start command through the wired interface.

When the wired communication control function unit 103-1 receives the Ad-hoc communication start command, it notifies the Ad-hoc management function unit 103-3 of the command. In response to the notified command, the Ad-hoc management function unit 103-3 transits the operation mode of the IC card function execution unit from the ordinary communication mode to the Ad-hoc communication mode and sets the present operation mode to the Ad-hoc state management function unit 103-4. Further, the Ad-hoc management function unit 103-3 stores the session number included in the Ad-hoc communication start command received from the card reading/writing device.

Figure 15:
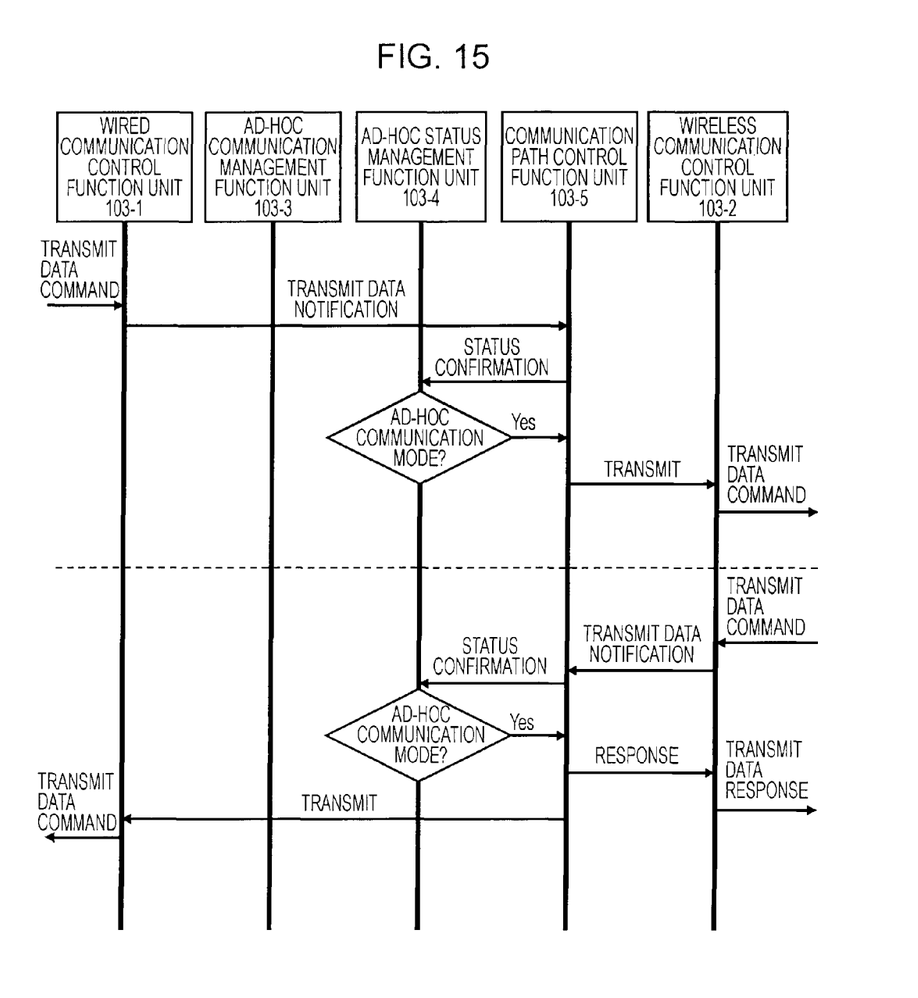
FIG. 15 is a view showing an operation flow for executing the Ad-hoc communication by the control arrangement shown in FIG. 13.

Further, FIG. 15 shows an operation flow for executing the Ad-hoc communication by the control arrangement shown in FIG. 13.

When a data transfer command is sent from the card reading/writing device through the wired interface, the wired communication control function unit 103-1 notifies the communication path control function unit 103-5 of the command.

The communication path control function unit 103-5 makes a query to an Ad-hoc state management unit and confirms the present operation mode of the IC card function execution unit. When the IC card function execution unit is in the Ad-hoc communication mode as well as the session number attached to the data transfer command agrees with the session number stored at the time the IC card function execution unit shifts to the Ad-hoc communication mode, The communication path control function unit 103-5 passes the data transfer command to the wireless communication control function unit 103-2 and transfers it to the card reading/writing device.

Further, when a data transfer command is sent from the card reading/writing device through the contactless interface, the wireless communication control function unit 103-2 notifies the communication path control function unit 103-5 of the command.

The communication path control function unit 103-5 makes a query to the Ad-hoc state management unit and confirms the present operation mode of the IC card function execution unit. When the IC card function execution unit is in the Ad-hoc communication mode as well as the session number attached to the data transfer command agrees with the session number stored at the time the IC card function execution unit shifts to the Ad-hoc communication mode, the communication path control function unit 103-5 passes a data transfer response to the wireless communication control function unit 103-2 and makes a response to the card reading/writing device. Then, the communication path control function unit 103-5 passes a data transfer command to the wired communication control function unit 103-1 and transfers it to the mobile terminal.

As described above, the communication system according to the present invention is arranged such that the mobile terminal defines the data transfer state for permitting the contactless data communication through the IC card function execution unit and the data not transfer state for not permitting the contactless data communication so that the IC card function execution unit manages the communication state of the mobile terminal. Then, when data is sent to the IC card function execution unit from the card reading/writing device through the contactless interface, the IC card function execution unit directly transmits the received data to the mobile terminal through the wired interface only when the IC card function execution unit is in the data transfer state. Further, when data is sent to the IC card function execution unit from the mobile terminal through the wired interface, the IC card function execution unit transfers the received data to the card reading/writing device through the contactless interface only when it is in the data transfer state.

As described above, since the IC card function execution unit, which is interposed between the card reading/writing device and the mobile terminal, can transfer data to the terminal side depending on whether it is in any of the data transfer state and the data not transfer state without depending on the notification from the mobile terminal, synchronization can be easily established, a transfer speed can be increased, and a large amount of data can be transmitted.

INDUSTRIAL APPLICABILITY

In the description, the present invention has been explained in detail referring to the specific embodiment. However, it is apparent that persons skilled in the art can modify or substitute the embodiment within the scope which does not depart from the gist of the present invention.

The description has mainly described the embodiment of the communication system among three components which is composed of the IC card function execution unit having the memory, the card reading/writing device capable of communicating with the IC card function execution unit through the contactless interface, and the information processing terminal capable of communicating with the IC card function execution unit through the wired interface, and to which the present invention is applied. However, the gist of the present invention is not necessarily limited thereto. It is needless to say that the present invention can be applied to a communication system among three components arranged using a communication interface other than the contactless interface.

For example, the IC card function execution unit can realize a similar transfer control in a communication system composed of a wireless network and a wired network by providing a hub with the same function when the hub has a contactless IC card interface to a card reading/writing device and a wired interface to an information processing terminal as well as has a wireless LAN function and a wired LAN function.

In short, since the present invention is disclosed using the example, the contents of the description should not be interpreted definitely. That is, the gist of the present invention should be judged in consideration of the appended claims.

The invention claimed is:

1. An information processing terminal, comprising:
an input unit;
a display unit; and
a program control unit that controls a communication operation with a communication device which comprises a contactless interface and a wired interface through the wired interface and a processing operation according to an interaction through the input unit, wherein the program control unit has a data transfer state for permitting a data transfer to the communication device through the wired interface and a data not transfer state for not permitting a data transfer to the communication device through the wired interface, and the program control unit is configured to receive transfer data from the communication device through the wired interface in the data transfer state or is configured to transmit data to an external device through the contactless interface of the communication device, through the wired interface.

2. The information processing terminal according to claim 1, wherein the communication device further comprises a memory, and the program control unit is configured to receive data stored in the memory from the communication device through the wired interface.

3. The information processing terminal according to claim 1, wherein the program control unit is configured to shift from the data not transfer state to the data transfer state in response to a signal received from the communication device through the wired interface.

4. The information processing terminal according to claim 3, wherein the signal is received via a signal line in the wired interface.

5. The information processing terminal according to claim 1, wherein the program control unit is configured to shift to the data not transfer state in response to the program control unit receiving a data transfer finish command from the communication device through the wired interface.

6. A method, comprising:
controlling a communication operation with a communication device, which comprises a contactless interface and a wired interface, through the wired interface and a processing operation according to an interaction through an input unit of the information processing terminal; and
receiving transfer data from the communication device through the wired interface in a data transfer state permitting a data transfer to the communication device through the wired interface, or transmitting data to an external device through the contactless interface of the communication device, through the wired interface, the information processing terminal having a data not transfer state for not permitting a data transfer to the communication device through the wired interface.

* * * * *